UNITED STATES PATENT OFFICE.

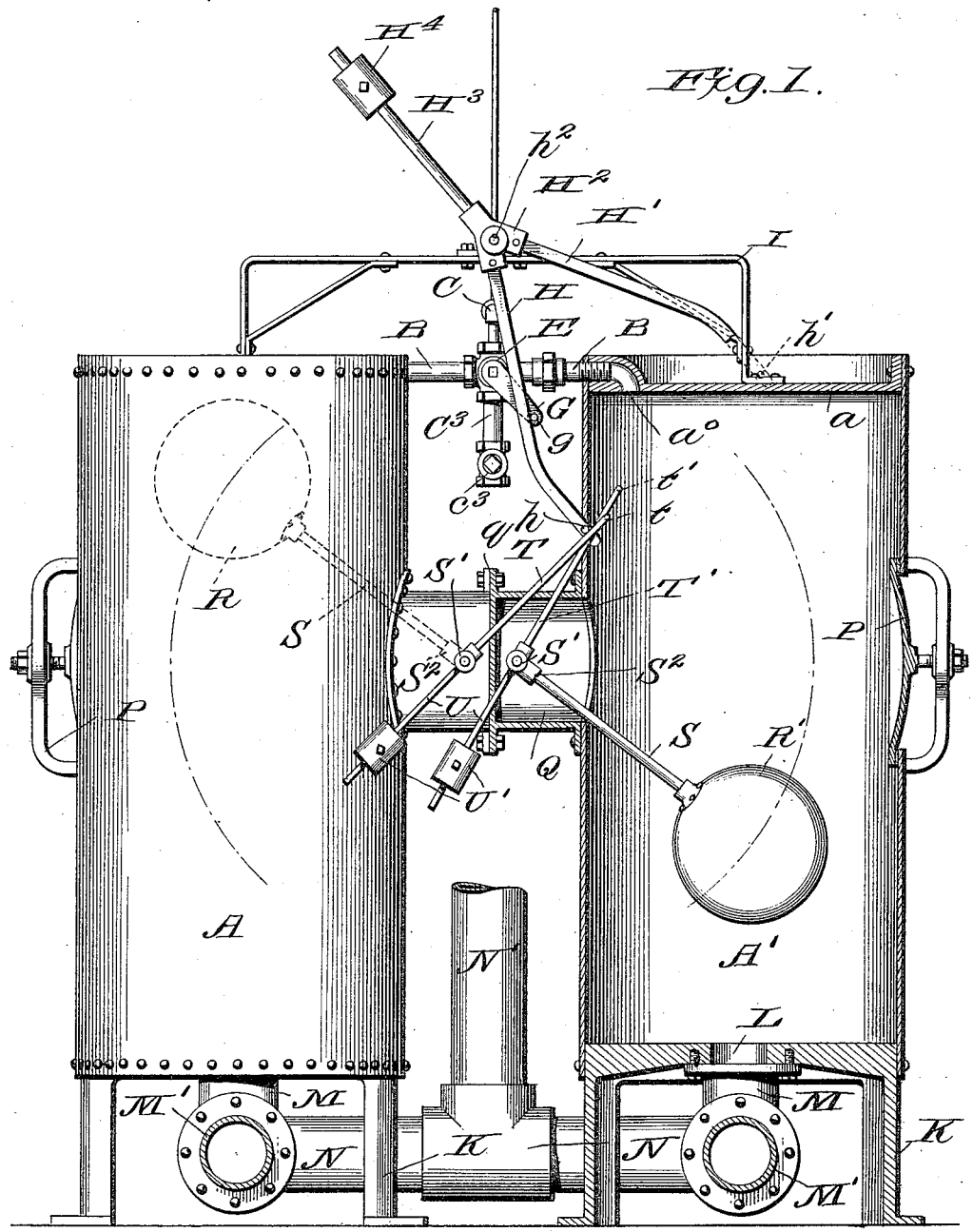

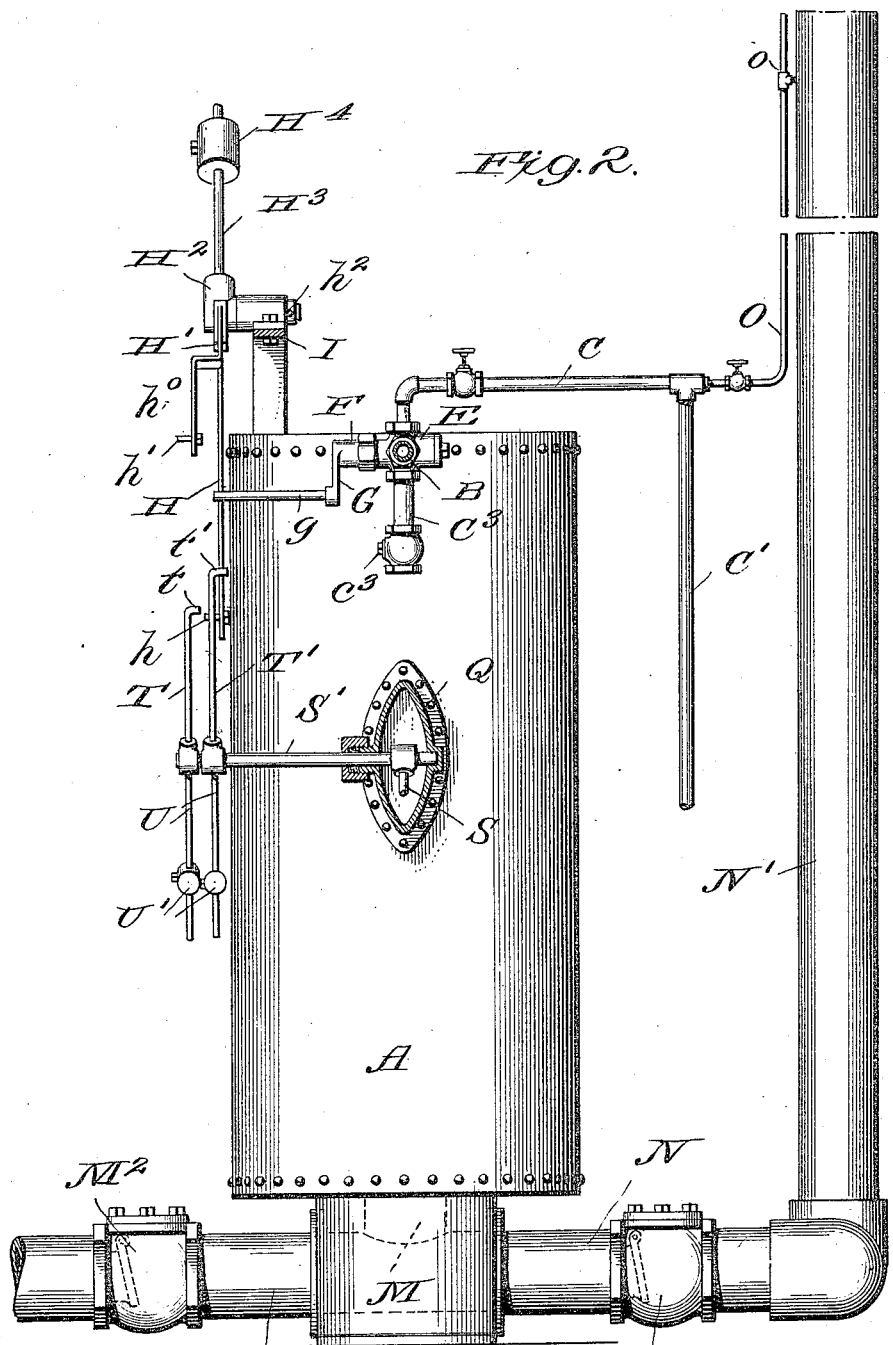

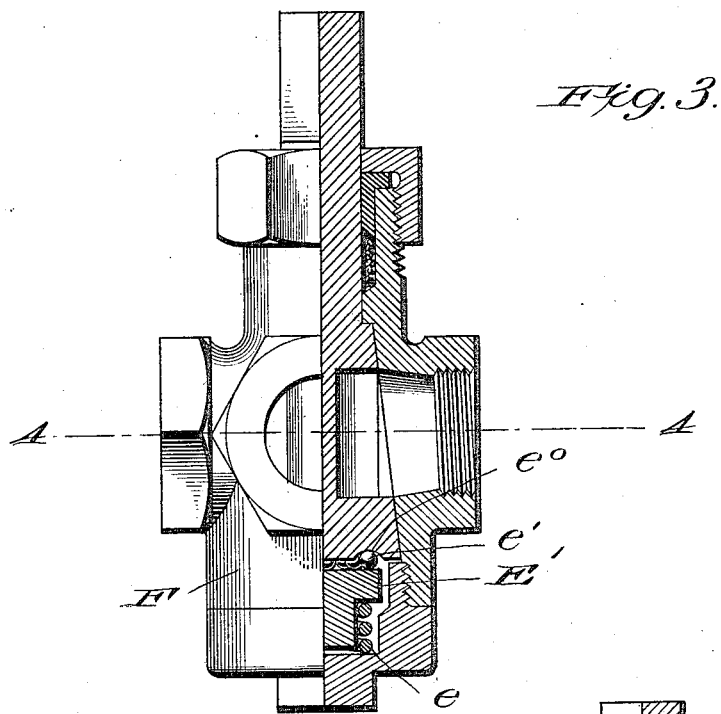
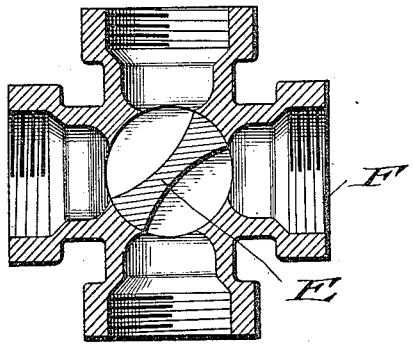
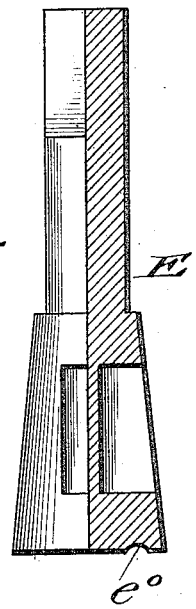

HASCAL A. HOGEL, OF BOSTON, MASSACHUSETTS.

PUMPING APPARATUS.

1,042,225.         Specification of Letters Patent.         Patented Oct. 22, 1912.

Application filed July 5, 1910. Serial No. 570,391.

*To all whom it may concern:*

Be it known that I, HASCAL A. HOGEL, a citizen of the United States, residing at Boston, in the county of Suffolk and State of Massachusetts, have invented certain new and useful Improvements in Pumping Apparatus; and I do hereby declare the following to be a full, clear, and exact description of the invention, such as will enable others skilled in the art to which it appertains to make and use the same.

My present invention relates to improvements in pumping aparatus, and is especially intended to provide a pump automatically operated by compressed air, which is adapted to force water, oil, or other liquid, to a considerable height.

The apparatus contained in my invention comprises one or more pairs of cylinders to which the compressed air and water are alternately admitted, and from which the air or water is alternately expelled by the automatic apparatus herein described and claimed.

Reference is had to the accompanying drawings, in which the same parts are indicated by the same letters throughout the several views.

Figure 1 is a front view showing one of the cylinders in elevation, and one in section, parts being broken away. Fig. 2 is a sectional elevation taken between the two cylinders of Fig. 1 and looking to the right, with the apparatus for automatically turning on or off the air pressure and for carrying away the water shown in elevation. Fig. 3 shows a horizontal view of a four way cock and its casing, used for turning on and off the air pressure. Fig. 4 shows a section through the Fig. 3 along the line 4—4 of said figure. Fig. 5 is a detail showing in section and in plan the four way cock of Fig. 3.

A and A' are two cylinders having closed upper heads $a$ perforated as at $a^0$ to receive the end of the air pipe B, which air pipe is connected by the pipes C and C' (see Fig. 2) to any suitable source of supply of compressed air.

$C^3$ is an exhaust pipe, which to prevent leakage may be closed by a valve $c^3$. Connecting the pipe C with the pipe B is a four way cock E, shown in detail in Figs. 3 to 5, whose casing F is connected at opposite sides to the pipes B and the pipes C and $C^3$ respectively. This four way cock is preferably made tapered as shown, having its seat grooved as at $e^0$ to engage balls $e'$ supported by the block E' pressed outward by the spring $e$, and thus the four way cock is automatically adjusted for wear. The four way cock is provided with an arm G, having a pin $g$ projecting therefrom, as shown in Figs. 1 and 2, and this pin projects in the paths of the two arms H and H' of the tumbling bob. These arms H and H' are held in the Y shaped socket $H^2$, pivoted as at $h^2$, and the said socket also carries an arm $H^3$ carrying an adjustable weight $H^4$.

I is the frame forming the support for the pivot of the tumbling bob, which frame may be conveniently attached to the tops of the two cylinders, and thus serve to brace the same.

The cylinders A and A' are mounted on suitable supports, such as K, and have their bottoms perforated as at L to permit the influx of water from the pipe M connected by the water main M' to any suitable water supply. Check valves opening inward are provided in said water main, as at $M^2$ (see Fig. 2). The water is carried off by the pipes N past the check valves, opening outward, $N^2$ (see Fig. 2) and into the delivery pipe N'.

O is a small pipe for compressed air, which opens at intervals, as at $o$, into the delivery pipe N', to facilitate the pumping, as will be hereinafter described.

Each cylinder may be provided with a suitable manhole and a manhole cover P for securing access to the interior thereof when desired. Each cylinder is provided with a box Q for the pivot of the float, and to brace the two cylinders these two boxes may be bolted together, as shown at $q$ in Fig. 1.

R and R' represent two floats, each connected to an arm S secured to the rock shaft S' journaled in the box Q, these rock shafts S' carrying operating arms T and T' respectively. Opposite these operating arms are corresponding arms U carrying weights U', as shown in Figs. 1 and 2. These operating arms T and T' have lugs $t$ and $t'$ to engage the arms H' and H respectively, the arm H' being bent outward as at $h^0$ (see Fig. 2) to clear the arm T' but to engage the lug $t$ on the arm T. It will be seen that the arms S, T and U and S', T' and U' respectively, rocking about the pivots S', constiutute T-shaped rocking frames, having the upper arm engaging the tumble bob and that the parts are balanced by the weights U'. The two arms H' and H are provided with pins $h'$ and $h$ to engage the arms T and T' respectively.

The operation of the apparatus is as follows: In the position shown in Fig. 1 the cylinder A is full of water, and air pressure from the four way cock E is turned on to cylinder A and cut off from A' which is then connected to exhaust $C^3$. As water is blown out of cylinder A under air pressure, it is rising in cylinder A' under hydraulic pressure, lifting float R' and causing arm T' to engage pin $h$ and press arm H back, lifting weight $H^4$. When the float R' rises far enough to carry weighted arm $H^3$ beyond the vertical position, the weight $H^4$ will rock arm H' into violent contact with pin $g$, which will rock the arm G in the opposite direction, cutting off air from cylinder A and opening exhaust, and turning air pressure on to cylinder A'. It will be seen that the arm T' acting as a short lever, will engage the pin $h$ near the end of the arm H at the beginning of the act of swinging the weight $H^4$ toward the vertical position, and that at this time the weight U' will also tend to assist the float R' in lifting said weight $H^4$, thus giving increased leverage and the help of the weight U' to start said weight $H^4$ upward, but as the float R' rises bringing the weight $H^4$ toward the vertical position the lug T' at the end of arm T' will engage the arm H, nearer its pivot than the pin $h$, and the pin $h$ will swing clear of engagement with the arm T', causing a quicker movement of said arm H, and of the weight $H^4$, but at a less leverage, while the weight U' will partially oppose the upward pressure of the water on the float; the general result being that the weight $H^4$ is started slowly with great leverage, is swung more rapidly as it approaches the vertical position, and when it passes the vertical position and swings away from engagement with the arm T' the weight checks the float from swinging up too rapidly, due to the release of pressure on the arm T'. Water will now rise in A and will fall in A'. It will be understood that while the water is rising in cylinder A' it is being pressed out of cylinder A by the compressed air, and that when the float R' in cylinder A' has risen enough to operate the tumbling bob, the float R in cylinder A has fallen to its lowest position, swinging the arm T back and causing it to engage the pin $h'$ as the water rises again in cylinder A. The rising of the float R will rock the tumbling bob in the opposite direction, until, when the float R is high enough, the weight $H^4$ will again take charge of the tumbling bob and throw the parts back to the initial position shown in Fig. 1. The cycle of operations is continued automatically for an indefinite period, so long as the apparatus is kept in repair, and so long as the supplies of compressed air and water are maintained.

By blowing compressed air through the pipe O and inlets $o$ into the water delivery pipe N', the operation of pumping is facilitated, as fully explained in my application, filed Jan. 9, 1909, Serial No. 471,472, and entitled, Improvements in compressed air water elevators.

It will be obvious that various modifications might be made in the herein described apparatus, and in the combination and arrangement of parts which might be used without departing from the spirit of my invention.

I claim:

1. A pumping apparatus comprising a pair of closed vessels; a source of liquid supply connected to and leading from said vessels, with check valves controlling the liquid; a source of supply of compressed air connected to both of said vessels; a valve controlling said compressed air supply; an actuating arm for said valve; a weighted arm journaled above said valve and having members adapted to engage with and move said valve actuating arm; an arm journaled to swing in each vessel; a float secured to each arm; and a weighted bar located outside each vessel and fixedly secured to move with its respective arm, said bars adapted to engage with and actuate said weighted bar members and move the same to actuate the air valve through the rise and fall of said floats, whereby to admit the air supply alternately into said vessels, substantially as described.

2. A pumping apparatus comprising a pair of closed vessels, a source of liquid supply connected to and leading from said vessels with check valves controlling said liquid; a source of supply of compressed air connected to both of the vessels, floats mounted in said vessels, and means operated by the rise and fall of said floats for admitting compressed air alternately to each of said vessels and for simultaneously allowing the compressed air to escape from the other vessel, the said means comprising an inverted Y-shaped tumbling bob having an upper weighted arm and two downwardly projecting engaging arms, a four way cock controlling the air supply and operated by the two engaging arms of said tumbling bob, and arms moved by said floats and engaging the engaging arms of said tumbling bob, substantially as described.

3. A pumping apparatus comprising a pair of closed vessels, a source of liquid supply connected to and leading from said vessels with check valves controlling said liquid; a source of supply of compressed air connected to both of the vessels, floats mounted in said vessels, and means operated by the rise and fall of said floats for admitting compressed air alternately to each of said vessels and for simultaneously allowing the compressed air to escape from the other vessel, the said means comprising an inverted Y-shaped tumbling bob, having an upper weighted arm and two downwardly projecting engaging arms, a four way cock controlling the air supply and operated by the two engaging arms of said tumbling bob, and arms moved by said floats and engaging the engaging arms of said tumbling bob with weighted arms oppositely disposed to and counterbalancing the said arms moved by said float, substantially as described.

4. A pumping apparatus comprising a pair of closed vessels, a source of liquid supply connected to and leading from said vessels with check valves controlling said liquid; a source of supply of compressed air connected to both of the vessels, floats mounted in said vessels, and means operated by the rise and fall of said floats for admitting compressed air alternately to each of said vessels and for simultaneously allowing the compressed air to escape from the other vessel, the said means comprising an inverted Y-shaped tumbling bob having an upper weighted arm and two downwardly projecting engaging arms, a four way cock controlling the air supply and operated by the two engaging arms of said tumbling bob, and T-shaped rocking frames connected to and rocked by said floats, each rocking frame having one arm engaging the corresponding arm of said tumbling bob; and an oppositely disposed weighted arm to counterbalance same, substantially as described.

5. A pumping apparatus comprising a pair of closed vessels, a source of liquid supply connected to and leading from said vessels with check valves controlling said liquid; a source of supply of compressed air connected to both of the vessels, floats mounted in said vessels, an inverted Y-shaped tumbling bob, having an upper weighted arm and two downwardly projecting engaging arms, a four way cock controlling the air supply and operated by the two engaging arms of said tumbling bob, and T-shaped rocking frames connected to and rocked by said floats, each rocking frame having one arm engaging the corresponding arm of said tumbling bob; and an oppositely disposed weighted arm to counterbalance same, substantially as described.

In testimony whereof, I affix my signature, in presence of two witneses.

HASCAL A. HOGEL.

Witnesses:
 MOSES ELY,
 JOSEPH G. HUNT.

---

Copies of this patent may be obtained for five cents each, by addressing the "Commissioner of Patents, Washington, D. C."